United States Patent
Southwick

(10) Patent No.: US 7,393,695 B2
(45) Date of Patent: Jul. 1, 2008

(54) COLLIDER CHAMBER APPARATUS AND METHOD OF USE OF SAME

(75) Inventor: Kenneth J. Southwick, Marshfield, MA (US)

(73) Assignee: Transkinetics Corporation, Marshfield, MA (US)

( * ) Notice: Subject to any disclaimer, the term of this patent is extended or adjusted under 35 U.S.C. 154(b) by 606 days.

(21) Appl. No.: 11/030,272

(22) Filed: Jan. 6, 2005

(65) Prior Publication Data
US 2005/0158872 A1 Jul. 21, 2005

Related U.S. Application Data

(60) Continuation of application No. 09/590,049, filed on Jun. 8, 2000, now Pat. No. 6,855,299, which is a division of application No. 09/354,413, filed on Jul. 15, 1999, now Pat. No. 6,110,432, which is a division of application No. 09/090,121, filed on Jun. 4, 1998, now abandoned.

(51) Int. Cl.
*G01N 1/10* (2006.01)
*B01J 10/00* (2006.01)
*B01C 3/02* (2006.01)
*F01C 1/10* (2006.01)
*F03C 2/00* (2006.01)

(52) U.S. Cl. .................. 436/180; 422/187; 422/100; 418/48; 418/3; 418/16; 418/29; 418/31; 418/22

(58) Field of Classification Search ................ 422/187, 422/100; 436/180; 418/48, 3, 16, 29, 31, 418/22
See application file for complete search history.

(56) References Cited

U.S. PATENT DOCUMENTS 2,965,362 A 12/1960 Fottman et al.
2,969,960 A 1/1961 Gurley, Jr.

(Continued)

*Primary Examiner*—Walter D. Griffin
*Assistant Examiner*—Natasha Young
(74) *Attorney, Agent, or Firm*—Wilmer Cutler Pickering Hale & Dorr LLP

(57) ABSTRACT

The disclosed apparatus includes a stator and a rotor disposed for rotation within the stator. An inner wall of the stator defines one or more collider chambers. Rotation of the rotor causes movement of fluid disposed between the rotor and stator and establishes a rotational flow pattern within the collider chambers. The fluid movement induced by the rotor increases the temperature, density, and pressure of the fluid in the collider chamber.

46 Claims, 11 Drawing Sheets

U.S. PATENT DOCUMENTS

| | | |
|---|---|---|
| 3,285,702 A | 11/1966 | Lamb et al. |
| 3,667,234 A | 6/1972 | De Lizasoain |
| 3,922,871 A | 12/1975 | Bolesta |
| 4,047,068 A | 9/1977 | Ress et al. |
| 4,098,582 A | 7/1978 | Takeda |
| 4,143,639 A | 3/1979 | Frenette |
| 4,405,658 A | 9/1983 | Young |
| 4,424,797 A | 1/1984 | Perkins |
| 4,516,044 A * | 5/1985 | Bone .......................... 310/64 |
| 4,595,546 A * | 6/1986 | Wheeler, Jr. ................. 264/83 |
| 4,685,443 A | 8/1987 | McMurtry |
| 4,685,534 A | 8/1987 | Burstein et al. |
| 4,702,846 A | 10/1987 | Ryynanen |
| 4,840,645 A | 6/1989 | Woodworth et al. |
| 4,913,556 A * | 4/1990 | Schroter et al. ............. 366/305 |
| 5,053,127 A | 10/1991 | Schoendorfer et al. |
| 5,088,831 A | 2/1992 | Reinhall |
| 5,088,889 A * | 2/1992 | Wolff ...................... 415/171.1 |
| 5,141,328 A | 8/1992 | Dilley |
| 5,171,138 A * | 12/1992 | Forrest ........................ 418/48 |
| 5,171,139 A * | 12/1992 | Underwood et al. .......... 418/48 |
| 5,534,118 A | 7/1996 | McCutchen |
| 5,538,630 A | 7/1996 | Burns |
| 5,554,301 A | 9/1996 | Rippetoe et al. |
| 5,571,975 A | 11/1996 | Smith, Jr. et al. |
| 5,676,801 A | 10/1997 | El-Sayed |
| 5,722,820 A * | 3/1998 | Wild et al. .................... 418/48 |
| 5,857,842 A * | 1/1999 | Sheehan ..................... 417/420 |
| 5,860,605 A | 1/1999 | Van Der Zanden |
| 6,102,681 A * | 8/2000 | Turner ......................... 418/48 |
| 6,110,432 A | 8/2000 | Southwick |
| 6,855,299 B1 | 2/2005 | Southwick |

* cited by examiner

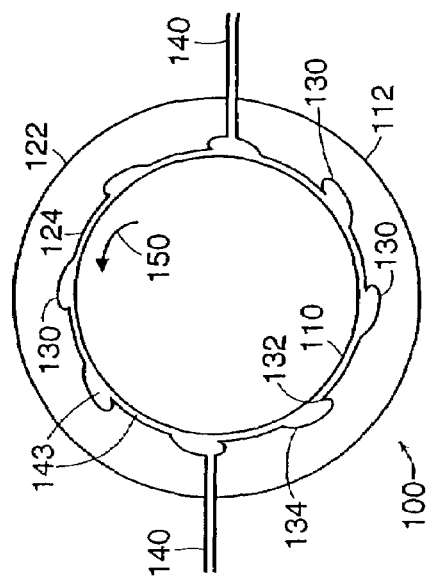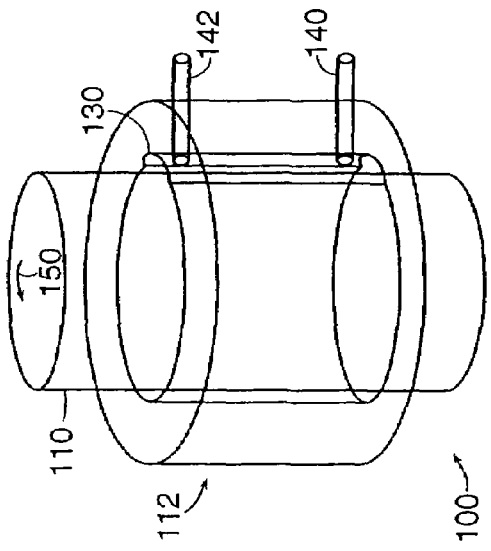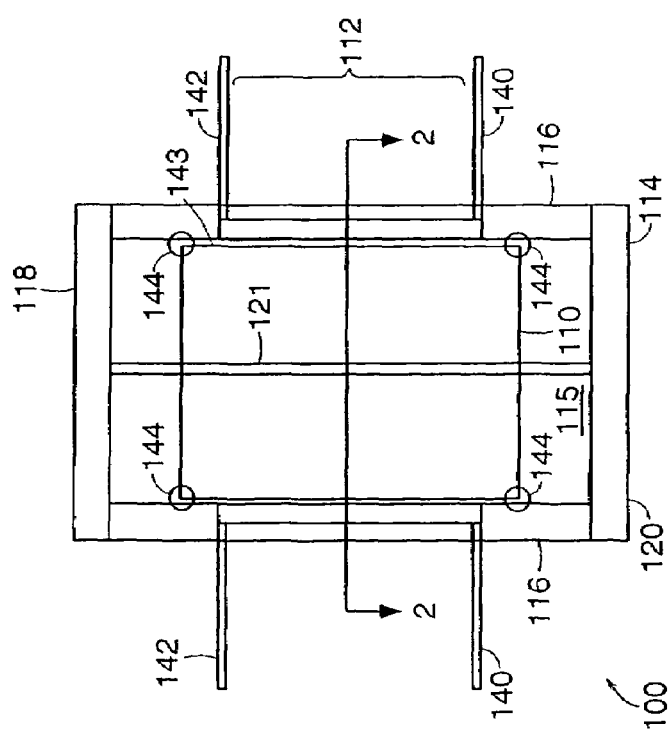

COLLIDER CHAMBER APPARATUS AND METHOD OF USE OF SAME

CROSS-REFERENCE TO RELATED APPLICATIONS

This application is a continuation of U.S. patent application Ser. No. 09/590,049 filed Jun. 8, 2000, which is now U.S. Pat. No. 6,855,299 issued Feb. 15, 2005, which is a divisional of U.S. patent application Ser. No. 09/354,413 filed July 15, 1999, now issued as U.S. Pat. No. 6,110,432, which is a divisional of U.S. application Ser. No. 09/090,121 filed Jun. 4, 1998, now abandoned.

BACKGROUND OF THE INVENTION

The present invention relates to a collider chamber apparatus. More specifically, the present invention relates to an apparatus and method for increasing the number of molecular collisions that occur in a fluid and further relates to using artificially induced movement to increase the heat of a fluid.

Many devices are known that use motion to manipulate fluids. For example, common household blenders use rotary motion of a stirring blade to mix or froth fluids. As another example, U.S. Pat. No. 3,285,702 issued to Lamb et al. (see FIG. 4 of Lamb et al.) discloses a device for mixing fluids to increase chemical reactions between multiple reactants. As yet another example, centrifuges are known for using rotary motion to separate solid particles suspended in a fluid from the fluid. All these devices induce some type of motion in a fluid to change some of the fluid's properties in a desired fashion.

It is also known that application of heat to a fluid will increase the speed of molecules in that fluid. However, it has heretofore been unknown to use motion to produce fundamental changes in the properties of a fluid.

It is therefore an object of the present invention to provide a collider chamber apparatus for increasing and controlling the number of molecular collisions occurring in a fluid.

It is yet another object of the invention to provide a collider chamber apparatus that induces movement in a fluid and thereby increases the temperature of the fluid.

It is still another object of the invention to provide a collider chamber apparatus that adds kinetic energy to a fluid and converts that kinetic energy into thermal energy.

SUMMARY OF THE INVENTION

These and other objects are provided by a collider chamber apparatus. The apparatus includes a rotor and a stator, and the stator defines a plurality of collider chambers. Rotation of the rotor induces cyclonic fluid flow patterns in each of the collider chambers.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE FIGURES

For a fuller understanding of the nature and objects of the present invention, reference should be made to the following detailed description taken in connection with the accompanying drawings in which the same reference numerals are used to indicate the same or similar parts wherein:

FIG. 1 shows a sectional side view of a collider chamber apparatus constructed according to the invention;

FIG. 2 shows a top sectional view of the collider chamber apparatus taken along line 2-2 of FIG. 1;

FIG. 3 shows a perspective view of the collider chamber apparatus shown in FIG. 1;

DETAILED DESCRIPTION OF THE PREFERRED EMBODIMENTS

Figure 1A:
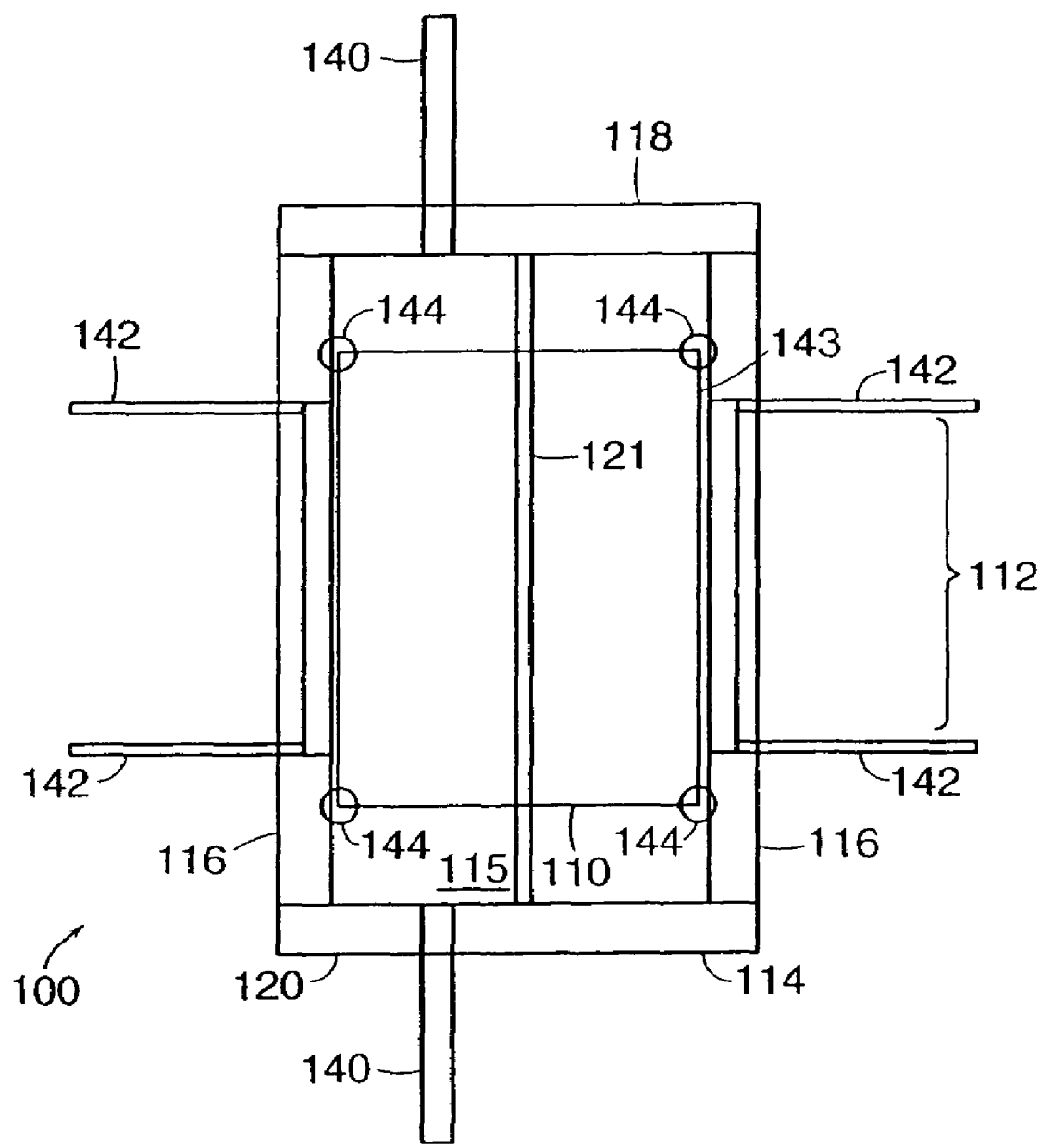
FIG. 1A shows a sectional side view of another embodiment of a collider chamber apparatus constructed according to the invention.

FIGS. 1 and 2 show front-sectional and top-sectional views, respectively, of a collider chamber apparatus 100 constructed according to the invention. FIG. 3 shows a perspective view of a portion of apparatus 100. Apparatus 100 includes a rotor 110 and a stator 112. The stator 112 is formed from part of a housing 114 (shown in FIG. 1) that encloses rotor 110. Housing 114 includes a cylindrical sidewall 116, a circular top 118, and a circular bottom 120. Top 118 and bottom 120 are fixed to sidewall 116 thereby forming a chamber 115 within housing 114 that encloses rotor 110. Rotor 110 is disposed for rotation about a central shaft 121 that is mounted within housing 114. Stator 112 is formed in a portion of sidewall 116.

As shown in FIG. 2, the cross section of stator 112 has a generally annular shape and includes an outer wall 122 and an inner wall 124. Outer wall 122 is circular. Inner wall 124 is generally circular, however, inner wall 124 defines a plurality of tear-drop shaped collider chambers 130. Each collider chamber 130 includes a leading edge 132, a trailing edge 134, and a curved section of the inner wall 124 connecting the leading and trailing edges 132, 134. For convenience of illustration, FIG. 3 shows only one of the collider chambers 130 in perspective. Further, FIG. 3 does not show the portion of housing 114 that extends above stator 112 and also does not show the portion of housing 114 that extends below stator 112.

The outer diameter of rotor 110 is preferably selected so that it is only slightly smaller (e.g., by approximately 1/5000 of an inch) than the inner diameter of stator 112. This selection of diameters minimizes the radial distance between rotor 110 and the leading edges 132 of the collider chambers 130 and of course also minimizes the radial distance between rotor 110 and the trailing edges 134 of the collider chambers 130.

Apparatus 100 also includes fluid inlets 140 and fluid outlets 142 for allowing fluid to flow into and out of the collider chambers 130. Apparatus 100 also preferably includes annular fluid seals 144 (shown in FIG. 1) disposed between the top and bottom of rotor 110 and the inner wall of sidewall 116. Inlet 140, outlet 142, and seals 144 cooperate to define a sealed fluid chamber 143 between rotor 110 and stator 112. More specifically, fluid chamber 143 includes the space between the outer wall of rotor 110 and the inner wall 124 (including the collider chambers 130) of stator 112. Seals 144 provide (1) for creating a fluid lubricating cushion between rotor 110 and sidewall 116, (2) for restricting fluid from expanding out of chamber 143, and (3) for providing a restrictive orifice for selectively controlling pressure and fluid flow inside fluid chamber 143. The space in chamber 115 between bottom 114 and rotor 110 (as well as the space between top 118 and rotor 110) serves as an expansion chamber and provides space for a reserve supply of fluid lubricant for seals 144.

FIG. 1A shows an alternative embodiment of apparatus 100 in which fluid inlets 140 provide fluid communication between the environment external to apparatus 100 and chamber 115 through top 118 and bottom 120, and in which fluid outlets 142 permit fluid communication between the environment external to apparatus 100 and the sealed chamber 143 through sidewall 116. Fluid inlets 140 may be used to selectively introduce fluid into chamber 115 through the top 118 and bottom 120, and some of the fluid introduced through inlets 140 may flow into sealed chamber 143. Fluid outlets 142 are used to selectively remove fluid from the sealed chamber 143. As those skilled in the art will appreciate, the fluid inlets and outlets permit fluid to flow into and out of, respectively, chamber 143 and may be arranged in many different configurations.

To simplify the explanation of the operation of apparatus 100, a simplified mode of operation will initially be discussed. In this simplified mode, fluid inlets and outlets 140, 142 are initially used to fill fluid chamber 143 with a fluid (e.g., water). Once chamber 143 has been filed, inlets 140 and outlets 142 are sealed to prevent fluid from entering or exiting the chamber 143. After fluid chamber 143 has been filed with fluid and sealed, a motor or some other form of mechanical or electrical device (not shown) drives rotor 110 to rotate about shaft 121 in a counter-clockwise direction as indicated by arrow 150 (in FIGS. 2 and 3). Rotation of rotor 110 generates local cyclonic fluid flow patterns in each of the collider chambers 130.

Figure 4:
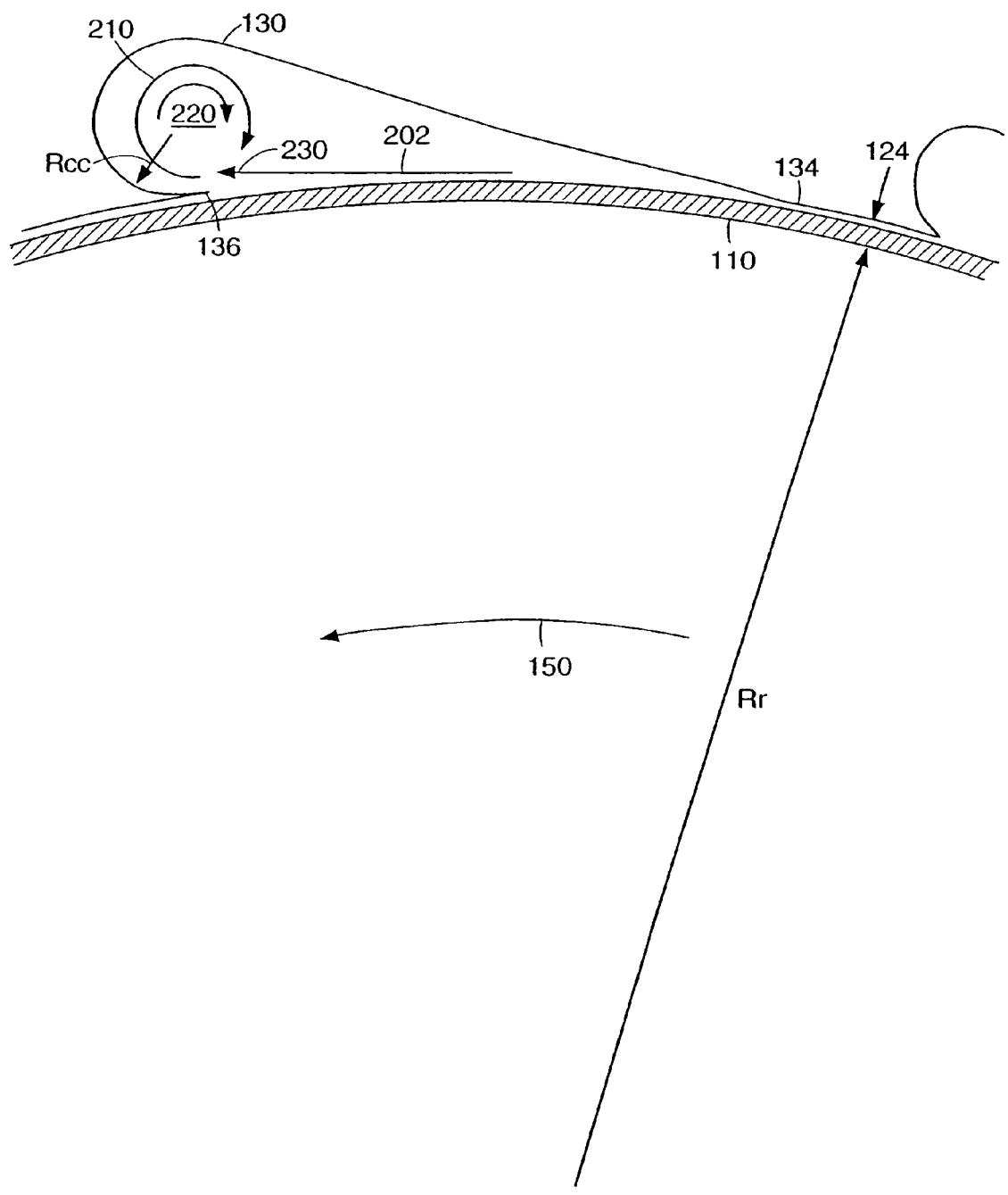
FIG. 4 shows a top view a cyclonic flow pattern in a collider chamber constructed according to the invention.

FIG. 4 shows a simplified top-sectional view of a portion of the fluid flow pattern in a single collider chamber 130 of apparatus 100. The rotation of rotor 110 in the direction of arrow 150 causes the fluid within chamber 143 to flow generally in the direction of arrow 150. Arrow 202 represents the trajectory of fluid molecules that are tangentially spun off of rotor 110 into collider chamber 130. These molecules are redirected by the wall of chamber 130 to flow in the direction of arrow 210 and form a cyclonic fluid flow pattern 220.

Molecules flowing in pattern 220 flow generally in a clockwise direction as indicated by arrow 210. The rotational velocity of flow pattern 220 is determined by the rotational velocity of rotor 110, the radius of rotor 110, and the radius of the portion of chamber 130 within which pattern 220 flows. More specifically, the rotational velocity (e.g., in revolutions per minute) of flow pattern 220 is determined approximately according to the following Equation (1)

$$V_{cc} \propto \frac{R_r}{R_{cc}} V_r \qquad (1)$$

where $V_{oc}$ is the rotational velocity of pattern 220, $V_r$ is the rotational velocity of rotor 110, $R_{oc}$ is the radius of the portion of collider chamber 130 within which pattern 220 flows as indicated in FIG. 4, and $R_r$ is the radius of rotor 110. The radius $R_{oc}$ of collider chamber 130 is preferably much smaller than the radius $R_r$ of rotor 110. Therefore, the rotational velocity $V_{oc}$ of flow pattern 220 is normally much greater than the rotational velocity $V_r$ of rotor 110. In other words, apparatus 100 employs mechanical advantage, created by the disparity in the radii of rotor 110 and collider chamber 130, to greatly increase the rotational velocity of fluid flowing in chamber 130.

As an example, in one embodiment the radius $R_r$ of rotor 110 is six inches, the radius $R_{oc}$ of the portion of collider chamber 130 within which pattern 220 flows is one eighth of an inch, the rotational velocity of the rotor is 3,400 revolutions per minute (RPMs), and the rotational velocity of flow pattern 220 is approximately 163,200 RPMs. Those skilled in the art will appreciate that 163,200 RPMs is an enormous rotational velocity and is far higher than has been generated with prior art systems for manipulating fluid. For example, some centrifuges generate rotational velocities as high as 70,000 RPMs, however, centrifuges do not approach the rotational velocities, and large centrifugal and centripetal forces, provided by the invention. Further, centrifuges provide only a single chamber for separation purposes whereas collider chamber apparatus 100 provides a plurality of collider chambers 130, all of which can accommodate a separately controllable cyclonic fluid flow for manipulating the fluid properties. Still further, centrifuges rapidly move a container of fluid but they do not move the fluid within the container relative to that container. Therefore, centrifuges do not greatly increase the number of molecular collisions occurring in the fluid contained within the centrifuge. In contrast to a centrifuge, an apparatus constructed according to the invention generates fluid flows that rotate at extremely high velocity relative to their containing collider chambers and as will be discussed in greater detail below thereby dramatically increases the number of molecular collisions occurring within the fluid contained within the apparatus.

The rotational velocity $V_{cc}$ discussed above is a macro-scale property of the cyclonic flow pattern 220. The velocities of individual molecules flowing in pattern 220 as well as the frequency of molecular collisions occurring in pattern 220 (i.e., the number of molecular collisions occurring every second) are important micro-scale properties of pattern 220. As is well known, the average velocity of molecules in a fluid (even a "static" or non-flowing fluid) is relatively high and is a function of the temperature of the fluid (e.g., 1500 feet per second for water at room temperature in a static condition). Typically, fluid molecules travel very short distances (at this high velocity) before colliding with other rapidly moving molecules in the fluid (e.g., the mean free path for an ideal gas at atmospheric pressure is $10^{-5}$ cm). The average molecular velocity and the average frequency of molecular collisions are micro-scale properties associated with any fluid. As will be discussed in greater detail below, operation of apparatus 100 dramatically increases the frequency of molecular collisions occurring in pattern 220 and also increases the velocities of molecules flowing in pattern 220, and thereby increases the temperature of fluid flowing in pattern 220.

Molecules flowing in pattern 220 continually collide with molecules that are spun into chamber 130 by rotor 110. In FIG. 4, the reference character 230 indicates the region where the maximum number of molecular collisions occurs between molecules flowing in pattern 220 and molecules that are spun off of rotor 110. The number of collisions added to the fluid in chamber 130 by operation of the invention is roughly proportional to the rotational velocity of the flow pattern 220 (i.e., since each molecule is likely to experience a new collision every time it traverses the circumference of the flow pattern and again passes through the location indicated by reference character 230). Therefore, the extremely high rotational velocity of cyclonic flow pattern 220 produces a correspondingly large number of molecular collisions. Such a large number of molecular collisions could not occur within a fluid in a static condition, and also could not occur within a fluid that does not move relative to its container (as in the case of a centrifuge).

A small amount of heat is generated every time a molecule flowing in pattern 220 collides with the wall of the collider chamber or with a molecule spun off of rotor 110. This heat results from converting kinetic energy of molecules flowing in pattern 220 into thermal energy. This energy conversion results in reducing the kinetic energy (or velocity) of molecules flowing in pattern 220, and if not for action of the rotor 110 the pattern 220 would eventually stop rotating or return to a static condition. However, rotor 110 continually adds kinetic energy to flow pattern 220 and thereby maintains the rotational velocity of pattern 220. The rotor 110 may be thought of as continually "pumping" kinetic energy into the molecules flowing in pattern 220, and the enhanced molecular collisions occurring in pattern 220 may be thought of as continually converting this kinetic energy into heat. As the apparatus 100 operates, the continuous generation of heat tends to increase the average molecular velocity of molecules flowing in pattern 220, and this increase in velocity further increases the number of molecular collisions occurring in pattern 220.

In the prior art, heat has been added to fluids and the molecular motion of the fluids have been increased in response to the added heat. In contrast to the prior art, the invention induces rapid motion in a fluid (i.e., the high macro-scale rotational velocity $V_{cc}$ of fluid in the collider chamber 130) and thereby generates heat in response to the increased motion. The invention therefore provides a fundamentally new way of heating, or adding energy to, fluids.

In a static fluid, molecular collisions are random in nature. In the collider chamber apparatus, the induced collisions are directional in nature. For example, as shown in FIG. 4, rotor 110 initially causes the fluid in chamber 143 to rotate in the direction indicated by arrow 150. Subsequently, some of the fluid is redirected by chamber 130 to flow in pattern 220. Since the fluid flow generated by rotor 110 in the direction of arrow 150 tangentially intersects the flow pattern 220, collisions between molecules flowing in pattern 220 and molecules spun off of rotor 110 consistently occur at the intersection of these two patterns indicated by reference character 230. Further, at the time of collision, the colliding molecules flowing in pattern 220 and spun off of rotor 110 are both moving in the same direction as indicated by arrow 202. This consistent occurrence, and the directional alignment of, molecular collisions within pattern 220 permit rotor 110 to continuously pump energy into flow pattern 220.

Since flow pattern 220 is restricted to flow within collider chamber 130, the constant addition of heat to flow pattern 220 continuously increases both the pressure and the density of the fluid flowing in pattern 220. In summary, the combined effect of the unusually high macro-scale rotational velocity of pattern 220, the continuous addition of kinetic energy by rotor 110, and the confined space of the collider chamber 130 within which the pattern 220 flows is to greatly (1) increase the number of molecular collisions occurring in the fluid, (2) increase the temperature of the fluid, (3) increase the pressure of the fluid, and (4) increase the density of the fluid.

As stated above, operation of apparatus 100 dramatically increases the number of molecular collisions occurring in the fluid flowing in pattern 220. It is difficult to calculate the actual number of molecular collisions added by operation of the apparatus, however, this number of collisions may be estimated for an exemplary embodiment as follows. Assuming that a collider chamber is 6" tall and that the molecules of fluid in the chamber have a height of $\frac{1}{1000}$", then approximately 6000 layers of fluid molecules are disposed in the collider chamber at any given instant. If the flow pattern within the collider chamber is rotating at 163,000 RPMs, or 26,000 revolutions per second, then the chamber adds at least 156,000,000 (26,000×6000) molecular collisions every second, since each molecule on the periphery of the collider chamber will collide with a molecule spun off of rotor 110 every time the molecule completes a rotation around the collider chamber. A typical collider chamber apparatus may include approximately 30 collider chambers, so operation of the apparatus adds at least 4,680,000,000 molecular collisions every second.

Figure 5:
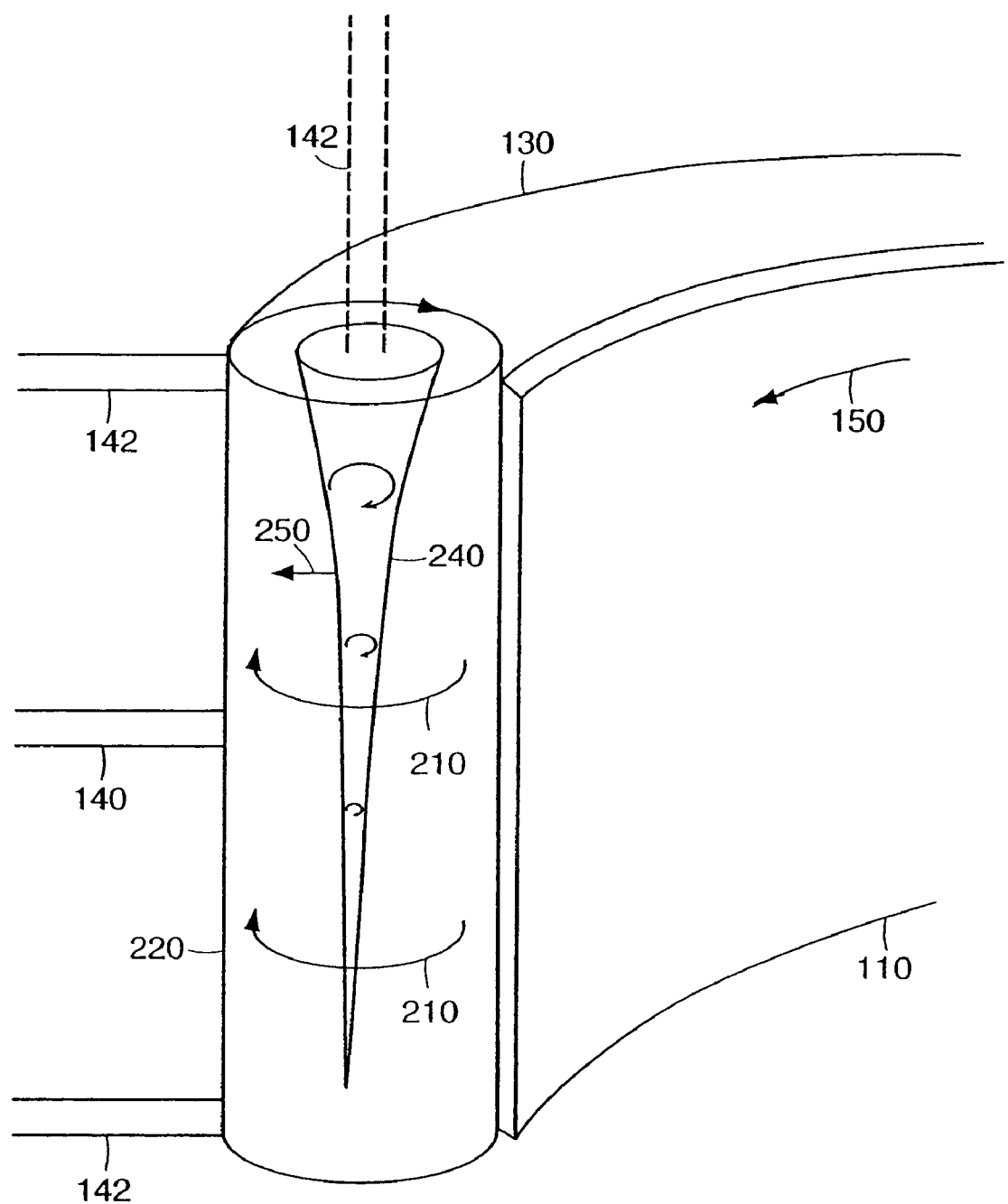
FIG. 5 shows a perspective view of a cyclonic flow pattern in a collider chamber constructed according to the invention.

FIG. 5 shows a simplified perspective view of cyclonic fluid flow pattern 220 flowing in a collider chamber 130 that is provided with a central inlet 140, an upper outlet 142, and a lower outlet 142. Molecules flowing in pattern 220 rotate at a high rotational velocity in a clockwise direction as indicated by arrows 210. The high velocity, and the high number of collisions, of molecules flowing in pattern 220 rapidly heats the fluid in pattern 220. Some of the heated fluid vaporizes and the vaporized fluid tends to collect in a generally conical, or "cyclone shaped", vapor region 240 towards the center of pattern 220. The vapor tends to collect near the center of pattern 220 because the large centrifugal force acting on mass flowing (or rotating) in pattern 220 tends to carry heavier (e.g., liquid) particles towards the perimeter of pattern 220 and correspondingly tends to concentrate lighter (e.g., gaseous or vapor) particles towards the center of pattern 220 where the centrifugal forces are reduced. The extremely high rotation velocity $V_{cc}$ of flow pattern 220 generates correspondingly large centrifugal forces at the periphery of pattern 220 and effectively concentrates the vapor in vapor region 240. Vapor region 240 tends to be conically shaped because the heated vapor tends to rise towards the top of chamber 230 and thereby to expand the diameter of region 240 near the top of region 240.

As the vapor in region 240 becomes hotter (due to the increased molecular collisions occurring in pattern 220), the vapor tends to expand and thereby generates a force that acts radially in the direction indicated by arrow 250 on the liquid in pattern 220. This radial force tends to expand the outer diameter of flow pattern 220. However, the walls of collider chamber 130 (and the fluid molecules that are continuously spun off of rotor 110 to impact with pattern 220) provide external forces that prevent the outer diameter of pattern 220 from expanding. The net result of (1) the external forces that prevent the outer diameter of pattern 220 from expanding and (2) the radial force generated by the expanding vapor in vapor region 240 is to increase the pressure in flow pattern 220. The increased pressure tends to (1) compress the fluid flowing in pattern 220 to its maximum density, (2) increase the number of molecular collisions occurring in pattern 220, and (3) increase the heating of the fluid flowing in pattern 220.

In operation of apparatus 100, several factors tend to have a cumulative, combinatorial effect. For example, the continuous addition of kinetic energy by rotor 100 results in continuous generation of heat within apparatus 100. This continuous generation of heat tends to continuously increase the average velocity of molecules flowing within flow pattern 220. This continuous increase in molecular velocity tends to further increase the frequency of molecular collisions occurring within pattern 220 and thereby also leads to increased heat generation within apparatus 100. Still further, the increased heat tends to increase the pressure and density of the fluid flowing within pattern 220 and this increased pressure and density also tends to increase the number of molecular collisions occurring within pattern 220 and thereby also leads to increased heat generation. All of these factors combined are believed to provide for exponentially fast heating of fluid flowing within pattern 220.

One simple use of apparatus 100 is as a heater of fluids. Fluid delivered to collider chamber 130 by inlet 140 is rapidly heated. The heated fluid may be removed by outlet 142 and delivered for example to a radiator or heat exchanger (not shown) for heating either a building or applying heat to a process. The fluid exiting the radiator or heat exchanger may then of course be returned to inlet 140 for reheating in apparatus 100.

Another example of a use for apparatus 100 is as a separator. For example, apparatus 100 may be used to separate water from a contaminated waste stream. As an example, fluid waste delivered via inlet 140 is heated inside collider chamber 130. Heated water vapor tends to rise to the top of chamber 130 whereas the solid waste portion contained in the fluid tends to separate and drop to the bottom. The concentrated and separated heavier waste product may be removed via the lower outlet 142 and the heated water vapor may be removed via the upper outlet 142. For such an application it may be desirable to provide a fluid outlet 142 of the type shown in dashed lines in FIG. 5 that permits withdrawal of vapor from the top of vapor region 240. This removed heated water vapor is sufficiently hot to be flash evaporated under a vacuum condition at a relatively low ambient temperature (e.g., at room temperature). The evaporated water vapor may then be condensed and filtered into pure water to complete the separation process. This same process may be applied to desalinization of sea water to separate the salt and other mineral compounds to produce a potable water for human consumption or other uses. Alternatively, instead of evaporating water and leaving the waste behind, if the waste product (e.g., alcohol) vaporizes at a lower temperature than water, the waste can be evaporated and separated from the water first and condensed in the same manner. In such a case, a water-alcohol waste stream could be continuously introduced into the collider apparatus via inlet 140, purified water could be continuously removed from the lower outlet 142 and alcohol vapor could be continuously removed from the upper outlet 142.

As another example of a useful separation process, apparatus 100 may be used to separate mercury from a waste water stream. Wastewater containing mercury compounds are a serious health concern and the technology for consistently removing mercury to below detectable levels of 2 ppb is currently underdeveloped. As is known, mercury in a wastewater stream may be placed into an ionic state by addition of chemicals (e.g., chlorine) to the wastewater stream. Apparatus 100 can be used to heat such a wastewater stream to a temperature above the evaporation point of mercury and below the evaporation point of the water fraction of the wastewater. The mercury may then be removed from apparatus 100 by evaporation and may then be condensed and filtered prior to final fluid disposal.

As yet another example of a useful separation process, apparatus 100 may be used to remove reclaimable salts from process wastewater. For example, metallic salts used in the plating industry may be removed from wastewater by using apparatus 100 to flash evaporate the water as generally described above. Such removal of these salts permits recovered clean water (i.e., the water evaporated by operation of apparatus 100 and subsequently condensed and if desired filtered) to be reused in the process rather than being discharged into a sewer and also permits the reclamation and reuse of the salts. Since such a process dramatically reduces the amount of waste disposed, into a sewer or otherwise, apparatus 100 offers significant benefits in pollution control.

In still another useful separation process, apparatus 100 may be used in the production of precious metals (e.g., gold, silver, platinum, iridium). Although not commonly known, conventional refining techniques sometimes only extract about 10% of the precious metal content from the concentrated precious metal bearing ores and, consequently, waste slags produced during the mining and smelting of concentrated precious metal bearing ores sometimes contain over 90% of the original precious metal content of the ore. These precious metals are still chemically bonded to, as an example, the iron sulphide mineral structure contained in the waste slag material. As described below, apparatus 100 may be used to extract more of the precious metal from the waste slag.

In the preferred process, the waste slag is initially reduced to a fine powder. A heated solution of water and sulfuric acid is then circulated through the powder to release the iron/precious metal sulfides. The solution is preferably continually leached through the slag powder to form a leachate containing metallic sulfides dissolved into solution with the water-sulfuric acid mixture. The leachate is then treated within apparatus 100. As discussed generally above, operation of apparatus 100 will heat the leachate within the apparatus. Gaseous oxygen and if desired an appropriate catalyst is then added to the heated leachate within apparatus 100 to permit the oxygen to react with the dissolved metallic sulfides and thereby produce sulfur trioxide ($SO_3$). This reaction also converts the metallic sulfides into metallic oxides and water. The sulfur trioxide may then be removed from apparatus 100. After removal of the sulfur trioxide, the material remaining within apparatus 100 is primarily water and metallic oxides. The water may be flash evaporated as discussed generally above to permit extraction of the metallic oxides. The metallic oxides may then be processed using conventional chemical or metallurgical techniques to extract the precious metals from the oxides. The sulfur trioxide removed from the apparatus 100 may also be added to water to form sulfuric acid ($H_2SO_4$), which can of course be used for preparing more leachate. As those skilled in the art will appreciate, apparatus 100 provides a convenient and efficient mechanism for converting the metallic sulfides to metallic oxides as discussed above.

Another example of a use for apparatus 100 is as a chemical reaction accelerator. The increased molecular collisions occurring within flow pattern 220 will increase the rate of reaction of any reactants flowing within pattern 220. To further increase reaction rates, it may be desirable to coat the outer wall of rotor 110, or the inner wall 124 of stator 112 with an appropriate catalyst or reagent.

As yet another example, apparatus 100 may be used to disassociate molecular bonds and thereby facilitate a chemical reaction occurring within the apparatus. More specifically, the increased high energy molecular collisions occurring within apparatus 100 may be used to disassociate molecular bonds and thereby to chemically alter the fluid contained within apparatus 100. If desired, this process may be enhanced by addition of selected chemical catalysts or reagents. As an example, if a mixture of alcohol, water, and an aluminum oxide catalyst is input to apparatus 100, the increased molecular collisions caused by operation of apparatus 100 can separate water from alcohol and form ethylene. So as shown by this example, apparatus 100 may be used to chemically alter a compound introduced into apparatus 100. In this example, since the evaporation point of ethylene is lower than the evaporation point of water, following the catalytic disassociation of water and alcohol, apparatus 100 may be used to flash evaporate the ethylene as described generally above and to thereby physically change the alcohol into ethylene. So generally, apparatus 100 may be used to chemically separate, or change, a compound into two or more distinct and different chemical compounds, and may then be subsequently used to physically separate those compounds from each other.

An example of such a use for collider apparatus 100 is to treat hazardous fluids such as PCB's or fluids containing other hazardous compounds such as dioxins. In such cases, the increased molecular collisions, heat, pressure, and density produced by apparatus 100, in addition to selected addition of chemical reagents or catalysts, may be used to disassociate molecular bonds in the fluid and to thereby separate the compound input to apparatus 100 into two or more chemically distinct compounds. Following this chemical separation, apparatus 100 may subsequently be used to flash evaporate one or more of the chemical compounds and thereby to physically separate the constituent compounds.

As those skilled in the art will appreciate, in addition to the simple methods of operation described above, apparatus 100 may be operated according to many different methods. For example, instead of rotating the rotor 110 at constant rotational velocity, it may be desirable to vary the rotor's rotational velocity. In particular, it may be advantageous to vary the rotor's rotational velocity with a frequency that matches a natural resonant frequency associated with the fluid flowing in flow pattern 220. Varying the rotor's rotational velocity in this fashion causes the frequency of molecular collisions occurring in pattern 220 to oscillate at this natural resonant frequency. Altering the frequency of molecular collisions in this fashion permits optimum energy transfer to the fluid flowing in pattern 220. Molecular collisions occurring at the fluid's natural resonant frequency facilitates weakening and disassociation of molecular bonds between molecules in the fluid allowing for the withdrawal of selected molecular compounds from the fluid mass flowing in pattern 220 as was discussed above.

As another example of variations from the basic embodiments of apparatus 100, rather than using a cylindrical rotor, it may be advantageous to use a rotor having a non-constant radius (e.g., a conically shaped rotor). Using a rotor with a non-constant radius induces different velocities and different frequencies of molecular collisions in different portions of the chamber 130.

As yet another example of variations in apparatus 100, the fluids used in apparatus 100 may be pressurized by pumping or other means prior to introduction into chamber 143. Using pressurized fluids in this fashion increases the density of fluid in pattern 220 and increases the frequency of molecular collisions occurring in pattern 220. Alternatively, fluids may be suctioned into apparatus 100 by the vacuum created by the centrifugal forces within apparatus 100. As still another example, fluids may be preheated prior to introduction to apparatus 100. When apparatus 100 is used as part of a system, it may be advantageous to use heat generated by other parts of the system to preheat the fluid input to the apparatus. For example, if apparatus 100 is used to vaporize water and thereby separate water from a waste stream, heat generated by a condenser used to condense the vaporized water may be used to preheat the fluid input to apparatus 100.

Figure 6:
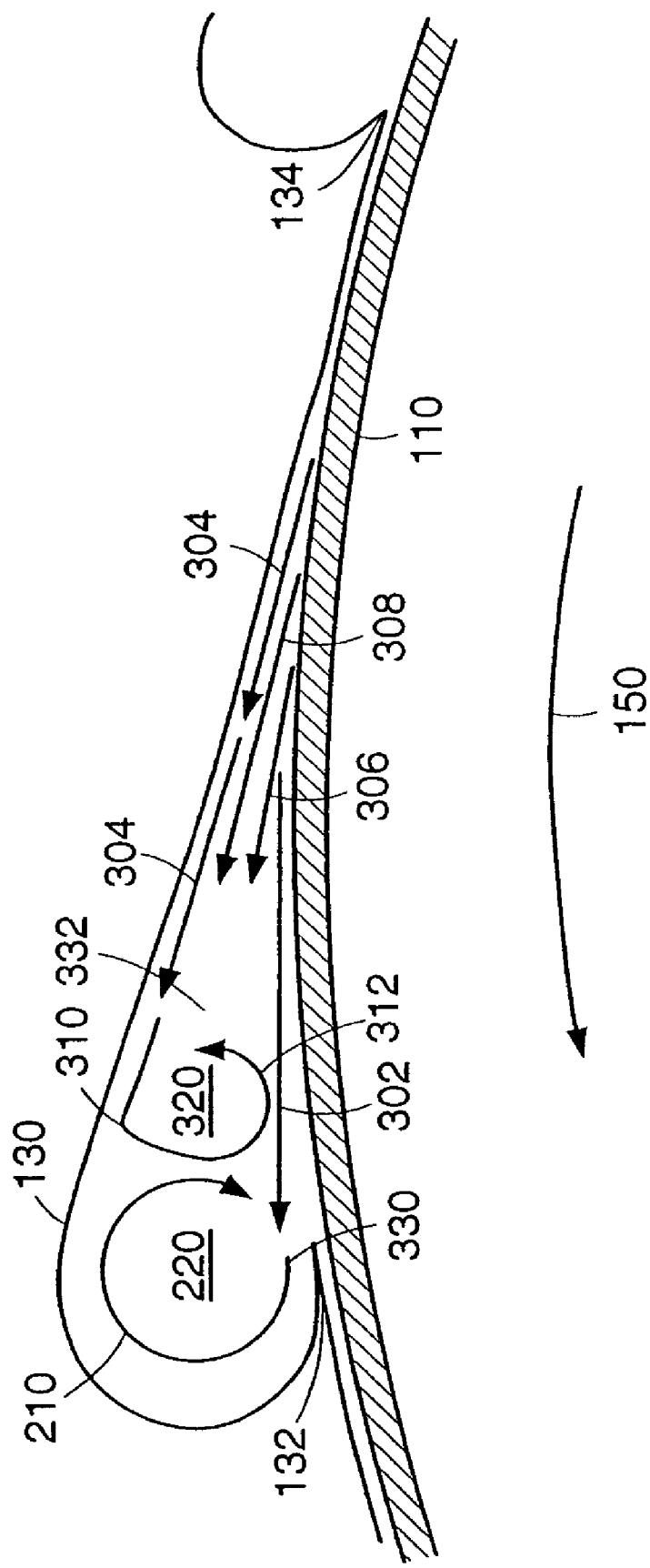
FIG. 6 shows a top view of another cyclonic flow pattern in a collider chamber constructed according to the invention.

FIG. 6 is similar to FIG. 4, however, FIG. 6 shows a more detailed top view of the fluid flow pattern in a single collider chamber 130. Arrows 302, 304, 306, 308 illustrate the trajectory of fluid molecules that are spun tangentially off of rotor 110 into collider chamber 130. Arrow 302 shows the trajectory of molecules that are thrown into collider chamber proximal leading edge 132. These molecules tend to collide with and enter cyclonic fluid flow pattern 220. Arrow 304 shows the trajectory of fluid molecules that are spun off of rotor 110 into chamber 130 proximal the trailing edge 134. These molecules tend to impact cyclonic fluid flow pattern 220 as indicated at reference character 310. Impact with flow pattern 220 tends to redirect these molecules in the direction indicated by arrow 312 and these molecules tend to form a secondary cyclonic flow pattern 320. Arrows 306 and 308 show the trajectory of fluid molecules that are spun off of rotor 110 into the center of collider chamber 130. These molecules tend to collide with the secondary cyclonic flow pattern 320.

There are several regions of enhanced molecular collisions in the flow patterns illustrated in FIG. 6. One such region is indicated by reference character 310. This region is where molecules in secondary cyclonic flow pattern 320 impact molecules flowing in the primary cyclonic flow pattern 220. Reference character 330 indicates another region of enhanced collision. This region is where molecules flowing in primary cyclonic flow pattern 220 tend to collide with molecules that are spun off of rotor 110. Finally, reference character 332 indicates another region of enhanced collision. This region is where molecules flowing in secondary cyclonic flow pattern 320 tend to collide with molecules spun off of rotor 110. The enhanced molecular collisions in all of these multiple cyclonic regions contribute to the increased heating of the fluid in collider chamber 130.

The properties of secondary cyclonic flow pattern 320 are similar to those of primary cyclonic flow pattern 220. The fluid flowing in the primary and secondary cyclonic flow patterns 220, 320 becomes heated and pressurized. However, since the radius of secondary cyclonic flow pattern 320 tends to be smaller than the radius of primary cyclonic flow pattern 220, the fluid flowing in pattern 320 tends (1) to rotate faster, (2) to experience more molecular collisions, and (3) to become heated more quickly, than the fluid flowing in pattern 220.

Figure 7:
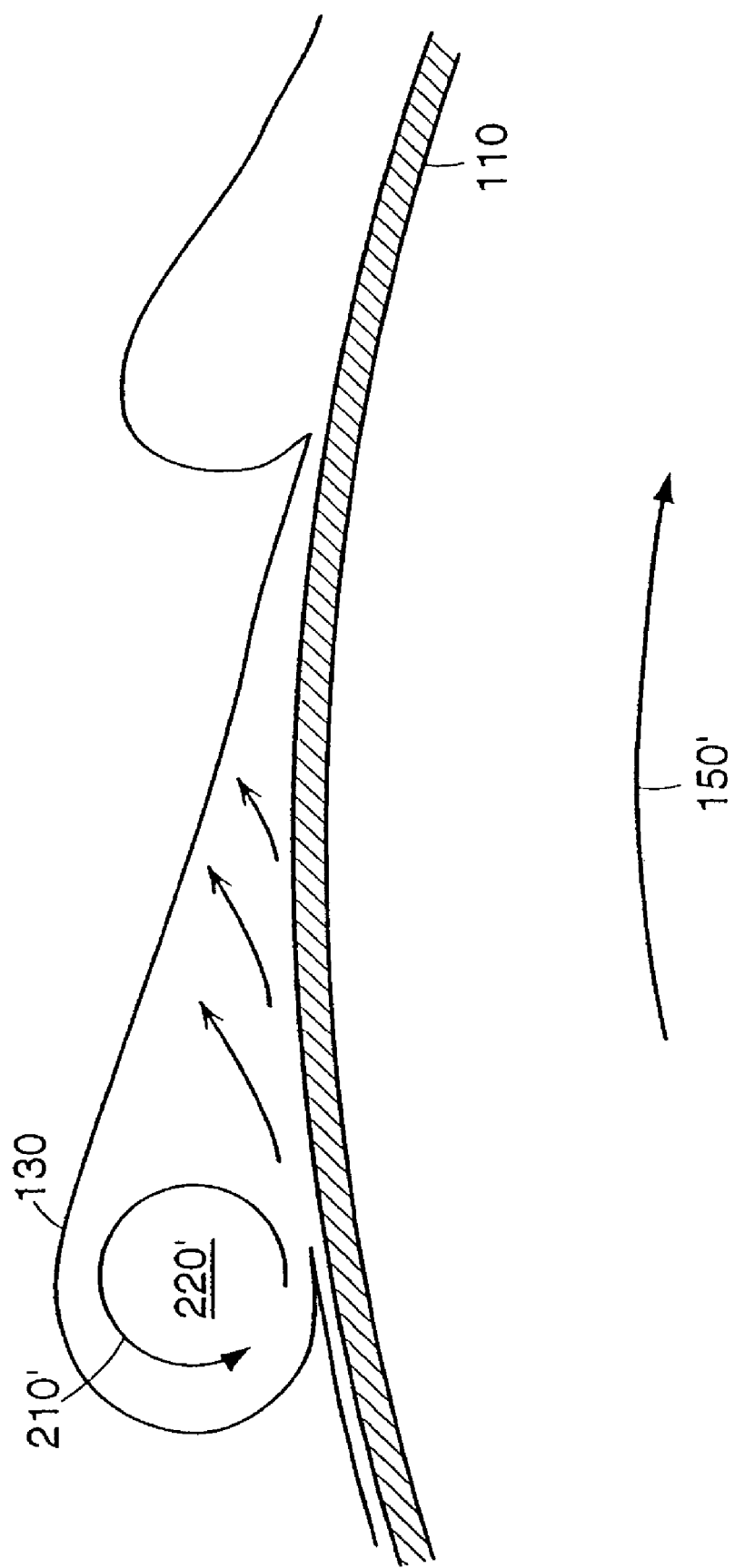
FIG. 7 shows a top view of another cyclonic flow pattern in a collider chamber constructed according to the invention.

As is shown in FIG. 6, when tear-drop shaped collider chambers are used, it is preferable to rotate rotor 110 in a direction that is towards the leading edge 132. However, as is shown in FIG. 7, the invention will still operate in such a configuration even if rotor 110 is rotated in the opposite direction. As shown in FIG. 7, opposite rotation of rotor 110 will still generate at least one cyclonic flow pattern 220' in collider chamber 130.

Figure 8:
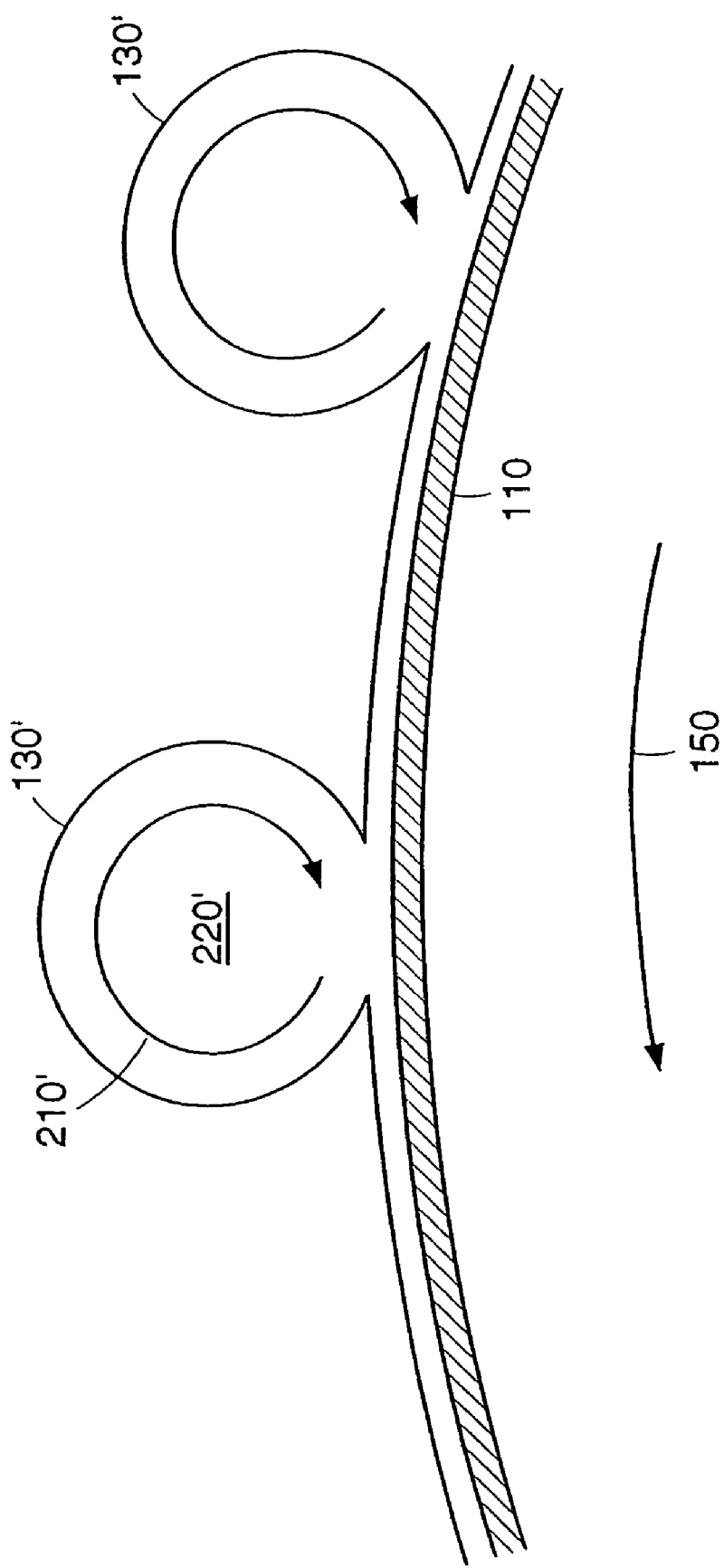
FIG. 8 shows a top view of alternative embodiments of collider chambers constructed according to the invention.

The tear-drop shape (as shown in FIG. 6) is the preferred shape for the collider chambers 130. However, as shown in FIG. 8, other shaped collider chambers may be used. For example, FIG. 8 shows a top-sectional view of a C-shaped (or circular) collider chamber 130'. Rotation of rotor 110 will generate a single cyclonic flow pattern 220' in each such shaped collider chamber 130'.

Figure 9:
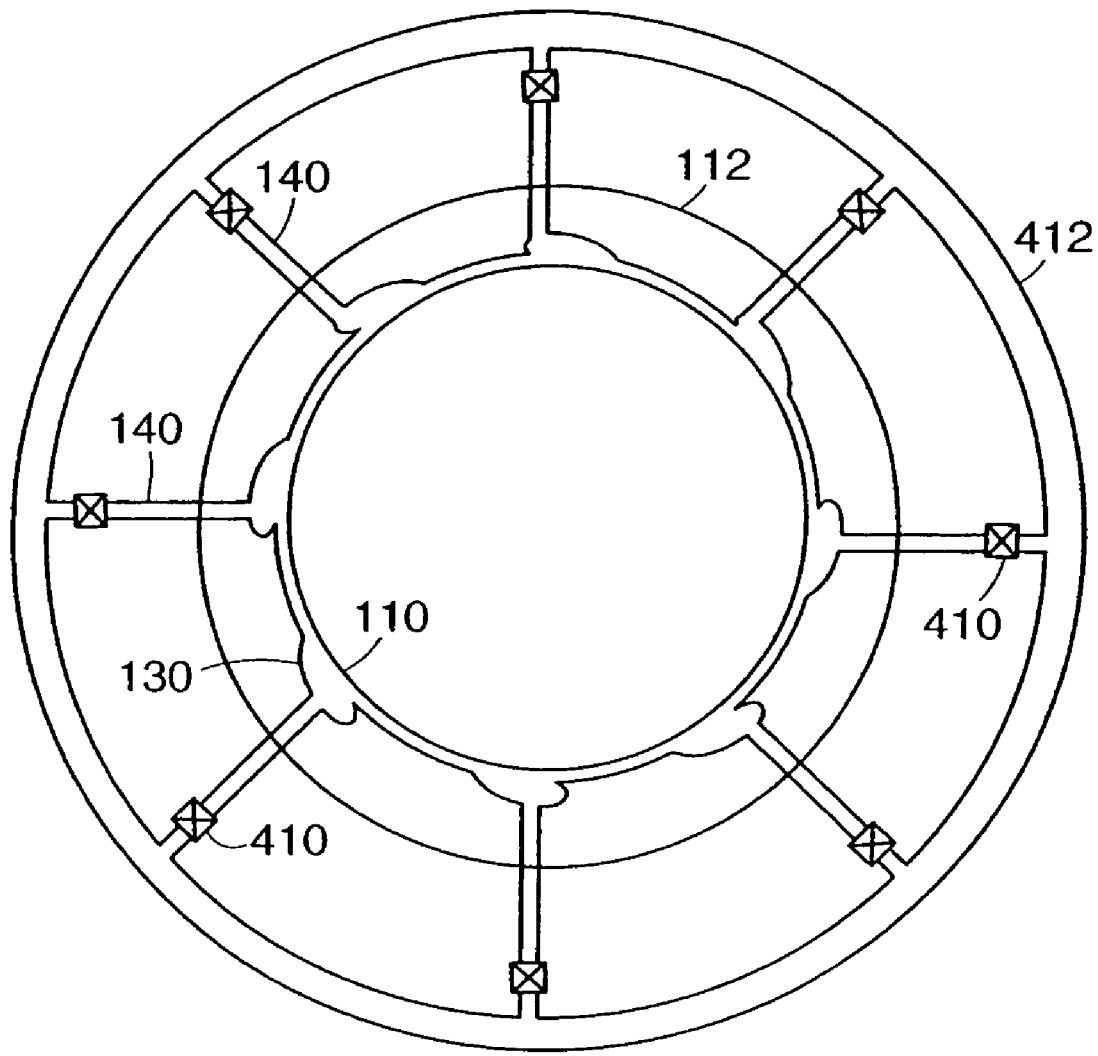
FIG. 9 shows a top sectional view of a collider chamber apparatus constructed according to the invention in which each collider chamber is provided with its own fluid inlet, outlet, and control valves.

FIG. 9 shows a sectional-top view of a preferred configuration of the apparatus 100 constructed according to the invention. In this configuration, each collider chamber 130 is provided with a corresponding fluid inlet 140 for introducing fluid into the collider chamber. Each fluid inlet is fluidically coupled to a manifold 412. Each fluid inlet is also provided with a valve 410 for selectively controlling the fluid flow between its respective collider chamber 130 and the manifold 412. Each collider chamber 130 is also preferably provided with a fluid outlet (not shown) and each of the fluid outlets are also preferably provided with a valve for selectively controlling the amount of fluid leaving the chamber 130. Providing each collider chamber 130 with its own fluid inlet, fluid outlet, and control valves allows the conditions (e.g., temperature or pressure) in each of the collider chambers 130 to be independently controlled.

Figure 10:
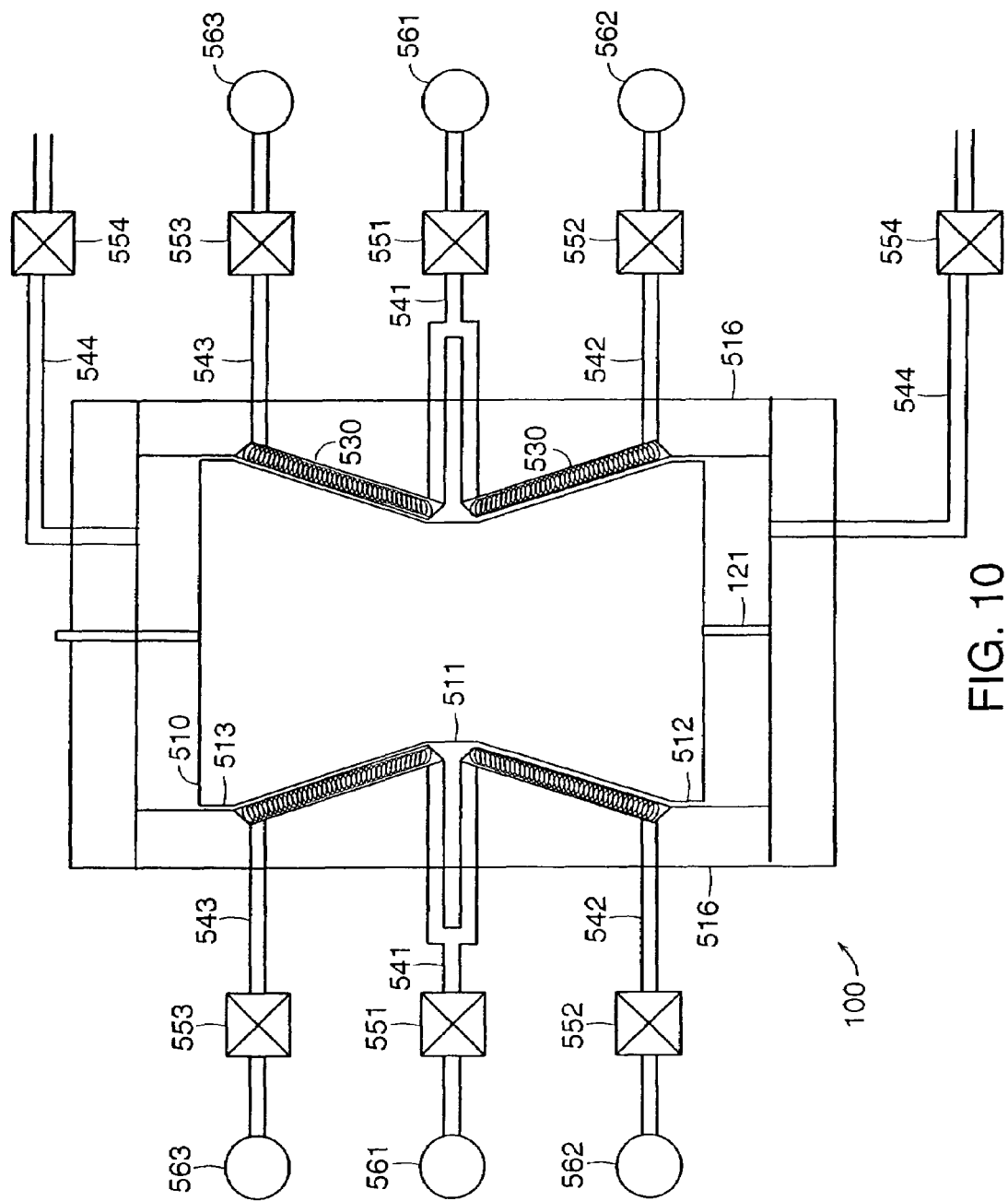
FIG. 10 shows a sectional side view of a collider chamber apparatus constructed according to the invention in which the rotor is characterized by an "hour-glass" shape.

FIG. 10 shows a sectional-side view of another embodiment of a collider chamber apparatus 100 constructed according to the invention. In this embodiment, the apparatus includes an "hour-glass shaped" rotor 510 disposed for rotation about shaft 121. Rotor 510 includes a middle portion 511, a bottom portion 512, and a top portion 513. The outer diameter of the middle portion 511 is smaller than the outer diameter of the top and bottom portions 512, 513. The apparatus further includes a sidewall 516 that defines a plurality of collider chambers 530 extending vertically along the periphery of the rotor 510. The apparatus further includes inlets 541 that allow fluid to enter the collider chambers 530 near the middle portion 511 of the rotor 510. The apparatus also includes outlets 542 and 543 that allow fluid to exit from the collider chambers 530 near the bottom and top portions 512 and 513, respectively. In the preferred embodiment, the apparatus is constructed as is illustrated generally in FIG. 9 with a plurality of collider chambers surrounding the outer periphery of the rotor and with each collider chamber 530 being provided with its own inlet 541 and its own outlets 542, 543. Each of the inlets 541 is preferably coupled to a manifold 561 via a control valve 551. Similarly, each of the outlets 542 and 543 is preferably coupled to manifolds 562 and 563, respectively, via control valves 552 and 553, respectively. Apparatus 100 may also include additional fluid inlets/outlets 544 for permitting fluid introduction and removal through the apparatus' top and bottom. These inlets/outlets 544 may also be provided with control valves 554.

In operation, the centrifugal force, and compression, generated by rotation of rotor 510 is greater near the top and bottom portions 513, 512 than near the middle portion 511. So, fluid provided to the collider chambers 530 via the inlets 541 is suctioned into the apparatus and is naturally carried by the centrifugal force generated by rotor 510 to the outlets 542, 543.

Figure 11:
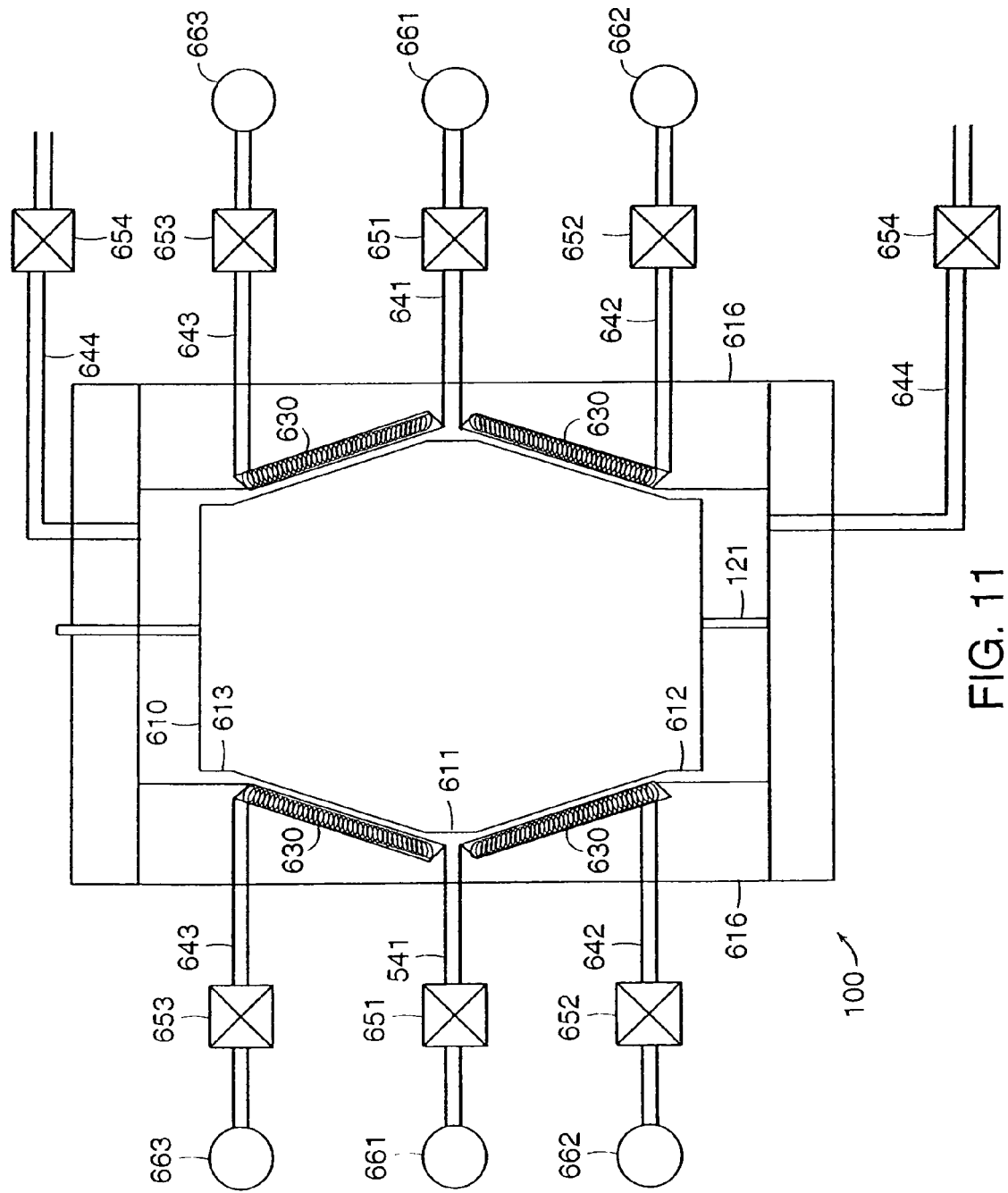
FIG. 11 shows a sectional side view of another embodiment of a collider chamber apparatus constructed according to the invention.

FIG. 11 shows a sectional side view of yet another embodiment of a collider chamber apparatus 100 constructed according to the invention. In this embodiment, the apparatus includes a rotor 610. Rotor 610 is generally cylindrical or barrel shaped, and rotor 610 includes a middle portion 611, a bottom portion 612 and a top portion 613. The outer diameter of middle portion 611 is greater than the diameters of bottom and top portions 612, 613. The apparatus further includes a sidewall 616 that defines a plurality of collider chambers 630 extending vertically along the periphery of the rotor 610. The apparatus further includes outlets 641 that allow fluid to exit the collider chambers 630 near the middle portion 611 of the rotor 610. The apparatus also includes inlets 642 and 643 that allow fluid to enter from the collider chambers 630 near the bottom and top portions 612 and 613, respectively. In the preferred embodiment, the apparatus is constructed as is illustrated generally in FIG. 9 with a plurality of collider chambers surrounding the outer periphery of the rotor and with each collider chamber 630 being provided with its own outlet 641 and its own inlets 642, 643. Each of the outlets 641 is preferably coupled to a manifold 661 via a control valve 651. Similarly, each of the inlets 642 and 643 is preferably coupled to manifolds 662 and 663, respectively, via control valves 652 and 653, respectively. Apparatus 100 may also include fluid inlets/outlets 644 for permitting fluid introduction and removal through the apparatus' top and bottom. These inlets/outlets 644 may also be provided with control valves 654.

In operation, the centrifugal force generated by rotation of rotor 610 is greater near the middle portion 611 than near the top and bottom portions 613, 612. So, fluid provided to the collider chambers 630 via the inlets 642, 643 is naturally carried by the centrifugal force generated by rotor 610 to the outlets 641.

Figure 12:
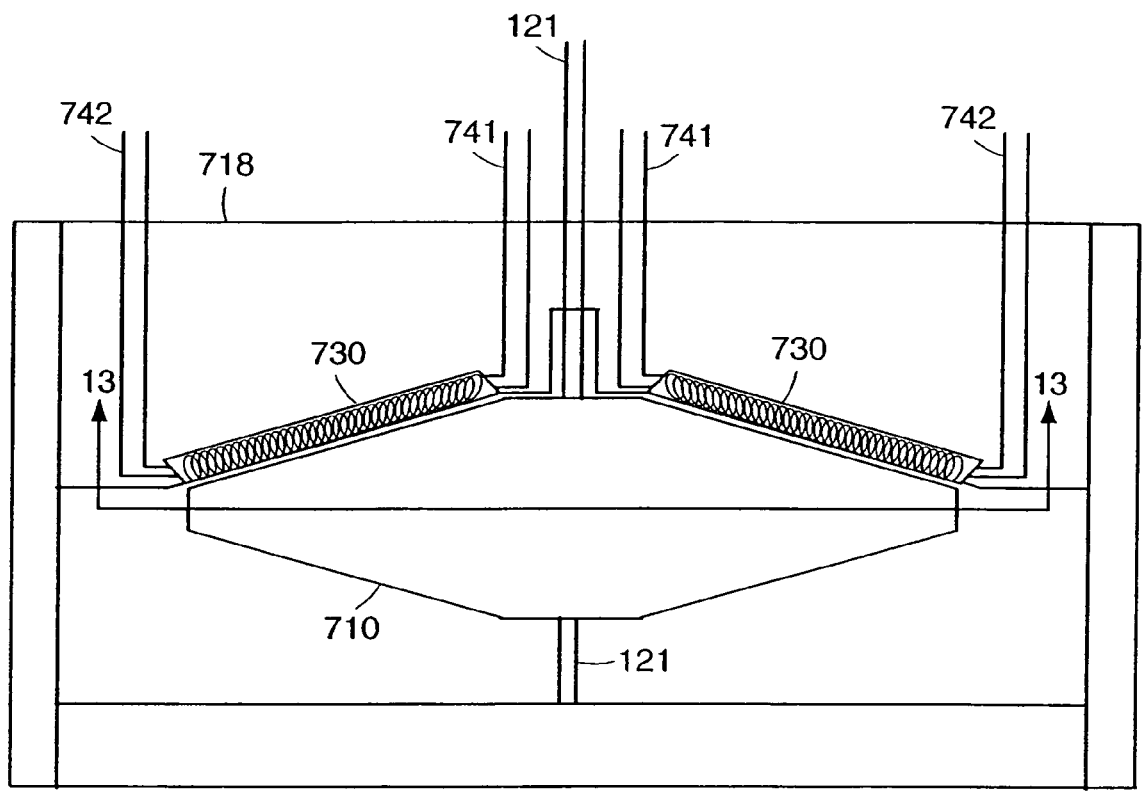
FIG. 12 shows a sectional side view of another embodiment of a collider chamber apparatus constructed according to the invention.
Figure 13:
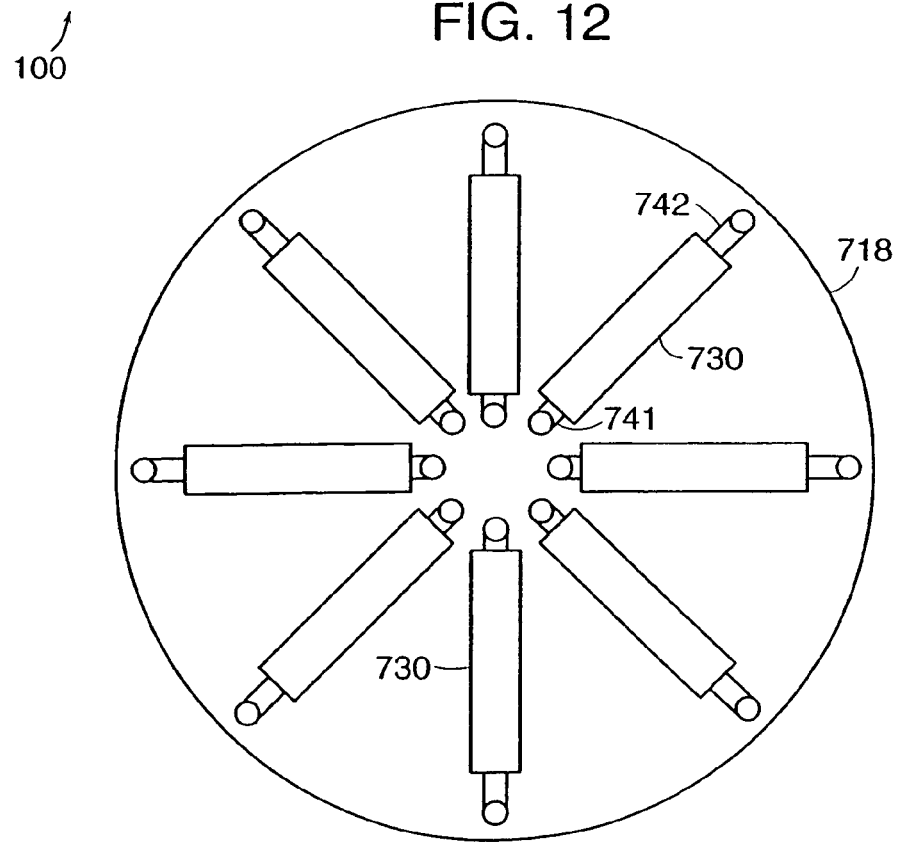
FIG. 13 shows a sectional view of the apparatus shown in FIG. 12 taken along line 13-13.

FIG. 12 shows a sectional-side view of yet another embodiment of a collider chamber apparatus 100 constructed according to the invention. This embodiment includes a generally disk shaped rotor 710 disposed for rotation about shaft 121 and a top 718 that defines a plurality of generally horizontal collider chambers 730 that extend along an upper surface of rotor 710. FIG. 13 shows a view of top 718 taken in the direction of line 13-13 shown in FIG. 12. Each of the collider chambers 730 is provided with an inlet 741 and an outlet 742. Centrifugal force generated by rotation of rotor 710 tends to carry fluid provided to collider chamber 730 via inlet 741 to the outlet 742. In preferred embodiments, each of the inlets and outlets is preferably provided with its own control valve (not shown).

Those skilled in the art will appreciate that the collider chambers illustrated in FIGS. 10-13 may be used to generate cyclonic fluid flows of the type generally illustrated in and described in connection with FIG. 5. FIGS. 10-13 have been presented to illustrate a few of the numerous embodiments of collider chamber apparatuses that are embraced within the invention.

As discussed above, collider chamber apparatuses constructed according to the invention may be used for a variety of purposes. The collider chamber apparatus provides for a diverse treatment of fluids, including liquids, gasses, slurries, and mixtures thereof. Inducing motion in a fluid to increase the molecular collisions occurring in the fluid and to thereby produce fundamental changes in the fluid's properties (e.g., change of temperature or chemical structure) is accomplished by creating directional flows within the fluid. Molecular collisions in a static fluid can only be random in nature. Molecular collisions in the collider chamber apparatus are directional in nature resulting in enhanced controllability of the properties of the fluid not before achievable. The use of induced motion to control the frequency of molecular collisions and the ability to alter the state of the fluid in a uniform manner thus allows for precise control of the fluid's desired properties.

Those skilled in the art will appreciate that apparatus 100 may be constructed from a variety of materials including metallic, thermoplastic, mineral, fiberglass, epoxy, and other materials. Further, it may be preferable to base the selection of the materials used to construct apparatus 100 on the fluids that will be used in the apparatus. Further, in different embodiments, the face of rotor 110 may be smooth, scoriated, or treated to increase capillary flow for the fluid. The rotor may also be treated to provide for catalytic reactions occurring within apparatus 100.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. An apparatus comprising:
   a stator including an inner wall, the inner wall defining a plurality of collider chambers;
   a rotor disposed for rotation relative to the stator, about an axis, an outer wall of the rotor being proximal to the inner wall of the stator, rotation of the rotor in a first direction relative to the stator causing a fluid in each of the collider chambers to rotate within the collider chamber in a second direction opposite to the first direction;
   a first seal disposed at a first location on the rotor;
   a second seal disposed at a second location on the rotor;
   a fluid inlet for delivering fluid to a first volume near the first seal, the first seal being disposed between the first volume and the collider chambers, the first seal permitting at least some of the fluid in the first volume to flow through the first seal and into at least one of the collider chambers; and
   a fluid outlet for removing fluid from a second volume near the second seal, the second seal being disposed between the second volume and the collider chambers, the second seal permitting at least some of the fluid in the at least one collider chamber to flow through the second seal and into the second volume.

2. An apparatus according to claim 1, the first seal being an annular seal.

3. An apparatus according to claim 1, the second seal being an annular seal.

4. An apparatus according to claim 1, further comprising a heat exchanger in fluid communication with the fluid outlet.

5. An apparatus according to claim 1, wherein rotation of the rotor causes the temperature of the fluid located in the plurality of collider chambers to increase.

6. An apparatus according to claim 1, wherein rotation of the rotor causes at least some of the molecular bonds of the fluid located in the plurality of collider chambers to dissociate.

7. An apparatus according to claim 1, further comprising an inlet valve connected to the fluid inlet.

8. An apparatus according to claim 1, further comprising an outlet valve connected to the fluid outlet.

9. An apparatus according to claim 1, each of the collider chambers having a chamber cross section normal to the axis, a distance from a point on the chamber cross section to any other point on the chamber cross section being less than a radius of the rotor.

10. An apparatus according to claim 1, wherein rotation of the rotor causes an acceleration of at least some of the fluid located in the plurality of collider chambers.

11. An apparatus according to claim 10, wherein the acceleration of at least some of the fluid located in the plurality of collider chambers causes the frequency of molecular collisions within the fluid to increase.

12. A fluid processing system comprising:
    a stator including an inner wall, the inner wall defining a plurality of collider chambers;
    a rotor disposed for rotation relative to the stator, about an axis, an outer wall of the rotor being proximal to the inner wall of the stator, rotation of the rotor in a first direction relative to the stator causing a fluid in each of the collider chambers to rotate within the collider chamber in a second direction opposite to the first direction, rotation of the rotor causing the temperature of the fluid in the collider chambers to increase; and
    a heat exchanger in fluid communication with at least one of the collider chambers for removing heat from the fluid.

13. A fluid processing system according to claim 12, each of the collider chambers having a chamber cross section normal to the axis, a distance from a point on the chamber cross section to any other point on the chamber cross section being less than a radius of the rotor.

14. A fluid processing system according to claim 12, further comprising:
    a first seal disposed at a first location on the rotor;
    a second seal disposed at a second location on the rotor;
    a fluid inlet for delivering fluid to a first volume near the first seal, the first seal being disposed between the first volume and the collider chambers, the first seal permitting at least some of the fluid in the first volume to flow through the first seal and into at least one of the collider chambers;
    a fluid outlet for removing fluid from a second volume near the second seal, the second seal being disposed between the second volume and the collider chambers, the second seal permitting at least some of the fluid in the at least one collider chamber to flow through the second seal and into the second volume.

15. An apparatus according to claim 14, the first seal being an annular seal.

16. An apparatus according to claim 14, the second seal being an annular seal.

17. A fluid processing system according to claim 14, further comprising an inlet valve connected to the fluid inlet.

18. A fluid processing system according to claim 14, further comprising an outlet valve connected to the fluid outlet.

19. An apparatus comprising:
    a stator including an inner wall, the inner wall defining a plurality of collider chambers;
    a rotor disposed for rotation relative to the stator, about an axis, a cross section of the rotor taken at any point along the axis being substantially circular, an outer wall of the rotor being proximal to the inner wall of the stator, rotation of the rotor in a first direction relative to the stator causing a fluid in each of the collider chambers to rotate within the collider chamber in a second direction opposite to the first direction.

20. An apparatus according to claim 19, further comprising:
    a first seal disposed at a first location on the rotor;
    a fluid inlet for delivering fluid to a fluid volume near the first seal, the first seal being disposed between the fluid volume and the collider chambers, the first seal permitting at least some of the fluid in the fluid volume to flow through the first seal and into at least one of the collider chambers;
    a second seal disposed at a second location on the rotor, the second seal inhibiting fluid from flowing out of the plurality of collider chambers; and
    one or more fluid outlets, each of the fluid outlets being coupled to a corresponding one of the collider chambers, each of the fluid outlets selectively permitting fluid to flow out of its corresponding collider chamber.

21. An apparatus according to claim 19, further comprising:

a first seal disposed at a first location on the rotor, the first seal inhibiting fluid from flowing out of the plurality of collider chambers;

one or more fluid inlets, each of the fluid inlets being coupled to a corresponding one of the collider chambers, each of the fluid inlets selectively permitting fluid to flow into its corresponding collider chamber;

a second seal disposed at a second location on the rotor; and a fluid outlet for removing fluid from a fluid volume near the second seal, the second seal being disposed between the fluid volume and the collider chambers, the second seal permitting at least some of the fluid in at least one collider chamber to flow through the second seal and into the fluid volume.

22. An apparatus according to claim 1, the stator being constructed of a first material and the rotor being constructed of a second material, the first material being different from the second material.

23. An apparatus according to claim 22, the first material having a first coefficient of thermal expansion and the second material having a second coefficient of thermal expansion, the first coefficient of thermal expansion being different from the second coefficient of thermal expansion.

24. An apparatus according to claim 1, the stator and rotor being constructed of a thermoplastic.

25. An apparatus according to claim 1, the outer wall of the rotor being constructed of more than one material.

26. An apparatus according to claim 1, the inner wall of the stator being constructed of more than one material.

27. An apparatus according to claim 1, at least a portion of the outer wall of the rotor being scoriated.

28. An apparatus according to claim 1, at least a portion of the outer wall of the rotor being coated with a catalyst.

29. An apparatus according to claim 1, the rotor including a top portion characterized by a top diameter, a middle portion characterized by a middle diameter, and a bottom portion characterized by a bottom diameter, the middle diameter being smaller than the top diameter, the middle diameter being smaller than the bottom diameter.

30. An apparatus according to claim 1, the rotor including a top portion characterized by a top diameter, a middle portion characterized by a middle diameter, and a bottom portion characterized by a bottom diameter, the middle diameter being larger than the top diameter, the middle diameter being larger than the bottom diameter.

31. An apparatus according to claim 1, the rotor including a first end portion characterized by a first end diameter and a second end portion characterized by a second end diameter, the first end diameter being smaller than the second end diameter.

32. An apparatus according to claim 1, at least a portion of the inner wall of the stator being coated with a reagent.

33. An apparatus according to claim 1, at least a portion of the inner wall of the stator being coated with a catalyst.

34. An apparatus according to claim 1, at least one of the plurality of collider chambers being characterized by a teardrop shape.

35. An apparatus according to claim 1, at least one of the plurality of collider chambers being characterized by a circular shape.

36. An apparatus according to claim 5, the temperature increase of the fluid causing the temperature of at least some of the components of the apparatus to increase.

37. An apparatus according to claim 5, the temperature increase of the fluid causing an average velocity of molecules in the fluid to increase.

38. An apparatus according to claim 1, the fluid in the first volume having a first pressure and the fluid in the second volume having a second pressure, a difference between the first and second pressure being controlled by a pressure difference controlling means.

39. An apparatus according to claim 11, the fluid having a resonant frequency, the rotation of the rotor selected to cause the frequency of molecular collisions to match the resonant frequency of the fluid.

40. A method of processing a fluid, comprising:

providing a stator and a rotor, wherein the stator includes an inner wall, the inner wall defining a plurality of collider chambers, and wherein the rotor includes an outer wall that is proximal to the stator inner wall;

providing a first seal disposed at a first location on the rotor, and a second seal disposed at a second location on the rotor;

delivering the fluid to a first volume near the first seal through a fluid inlet, wherein the first seal is disposed between the first volume and the collider chambers, and permits at least some of the fluid in the first volume to flow through the first seal and into at least one of the collider chambers;

withdrawing the fluid from a second volume near the second seal, wherein the second seal is disposed between the second volume and the collider chambers, and permits at least some of the fluid in the at least one collider chamber to flow through the second seal and into the second volume; and rotating the rotor, relative to the stator, about an axis, wherein rotation of the rotor in a first direction relative to the stator causes the fluid in each of the collider chambers to rotate within the collider chamber in a second direction opposite to the first direction.

41. A method according to claim 40, further including removing heat from the fluid.

42. A method according to claim 41, the removal of heat from the fluid being accomplished by a heat exchanger.

43. A method of processing a fluid, comprising:

disposing the fluid between a stator and a rotor, wherein the stator includes an inner wall, the inner wall defining a plurality of collider chambers, and wherein the rotor includes an outer wall that is proximal to the stator inner wall;

rotating the rotor, relative to the stator, about an axis, wherein rotation of the rotor in a first direction relative to the stator causes the fluid in each of the collider chambers to rotate within the collider chamber in a second direction opposite to the first direction, rotation of the rotor causing the temperature of the fluid in the collider chambers to increase; and removing heat from the fluid.

44. A method according to claim 43, the removal of heat from the fluid being accomplished by a heat exchanger.

45. An apparatus comprising:

a stator including an inner wall, the inner wall defining a plurality of collider chambers, the collider chambers extending along a linear axis; and a rotor disposed for rotation relative to the stator, about an axis, a cross section of the rotor taken at any point along the axis being substantially circular, an outer wall of the rotor being proximal to the inner wall of the stator, rotation of the rotor in a first direction relative to the stator causing a fluid in each of the collider chambers to rotate in a second direction opposite to the first direction.

46. An apparatus comprising:

a stator including an inner wall, the inner wall defining a plurality of collider chambers; and a rotor disposed for rotation relative to the stator, about an axis, a cross section of the rotor taken at any point along the axis being substantially circular, an outer wall of the rotor being proximal to the inner wall of the stator, rotation of the rotor in a first direction relative to the stator causing a fluid in each of the collider chambers to rotate in a second direction opposite to the first direction, the rotor being disposed within a space defined at least in part by the stator inner wall, the space being in fluid communication with the plurality of collider chambers, and the rotor not entering any one of the plurality of collider chambers during rotation of the rotor.

* * * * *